United States Patent
Lengemann et al.

(10) Patent No.: US 12,391,074 B2
(45) Date of Patent: Aug. 19, 2025

(54) PNEUMATIC TIRE FOR BICYCLE

(71) Applicant: Continental Reifen Deutschland GmbH, Hannover (DE)

(72) Inventors: Daniel Lengemann, Korbach (DE); Waldemar Drews, Korbach (DE)

(73) Assignee: Continental Reifen Deutschland GmbH, Hannover (DE)

( * ) Notice: Subject to any disclaimer, the term of this patent is extended or adjusted under 35 U.S.C. 154(b) by 29 days.

(21) Appl. No.: 18/006,702

(22) PCT Filed: Jul. 14, 2021

(86) PCT No.: PCT/DE2021/200093
§ 371 (c)(1),
(2) Date: Jan. 24, 2023

(87) PCT Pub. No.: WO2022/017567
PCT Pub. Date: Jan. 27, 2022

(65) Prior Publication Data
US 2023/0264523 A1 Aug. 24, 2023

(30) Foreign Application Priority Data
Jul. 24, 2020 (DE) .................. 20 2020 104 281.5

(51) Int. Cl.
*B60C 9/18* (2006.01)
*B60C 15/06* (2006.01)

(52) U.S. Cl.
CPC .. *B60C 15/0628* (2013.01); *B60C 2015/0614* (2013.01); *B60C 2015/065* (2013.01); *B60C 2200/12* (2013.01)

(58) Field of Classification Search
CPC ............ B60C 2200/10; B60C 2200/14; B60C 2200/12; B60C 15/0628; B60C 15/06;
(Continued)

(56) References Cited

U.S. PATENT DOCUMENTS 6,568,446 B1   5/2003  Schulte
2008/0190537 A1*  8/2008  Nakagawa .............. B60C 5/142
                                                                152/527
(Continued)

FOREIGN PATENT DOCUMENTS

CN      103260902 A    8/2013
DE      19909648 A1   11/2000
(Continued)

OTHER PUBLICATIONS

International Search Report dated Oct. 20, 2021 of International Application PCT/DE2021/200093 on which this application is based.
(Continued)

*Primary Examiner* — Cedrick S Williams
(74) *Attorney, Agent, or Firm* — Richard A. Wolf; Gregory Adams

(57) ABSTRACT

The invention relates to a two-wheeled vehicle pneumatic tire (1), preferably bicycle tire, particularly preferably racing bike tire (1), having a tread (2), a tire carcass, tire side walls (3) and two bead regions (4), each with a tire bead with a core (5), wherein the tire carcass comprises two carcass inlays (6,6') wherein the two carcass inlays (6, 6') extend from a zenith region (17) of the two-wheeled vehicle pneumatic tire (1) over the tire side walls (3) as far as the two bead regions (4) and are looped there around the respective core (5) from axially on the inside axially outward and end with carcass inlay ends (7,7') and wherein the two bead regions (4) each have a bead protective strip (8) arranged on the carcass from the outside as protection against chafing. The problem addressed is that of improving the rolling resistance.
The problem is solved in that the carcass inlay ends (7') of the inner carcass inlay (6') are covered from the outside by the respective bead protective strip (8), wherein the inner
(Continued)

Figure 1:
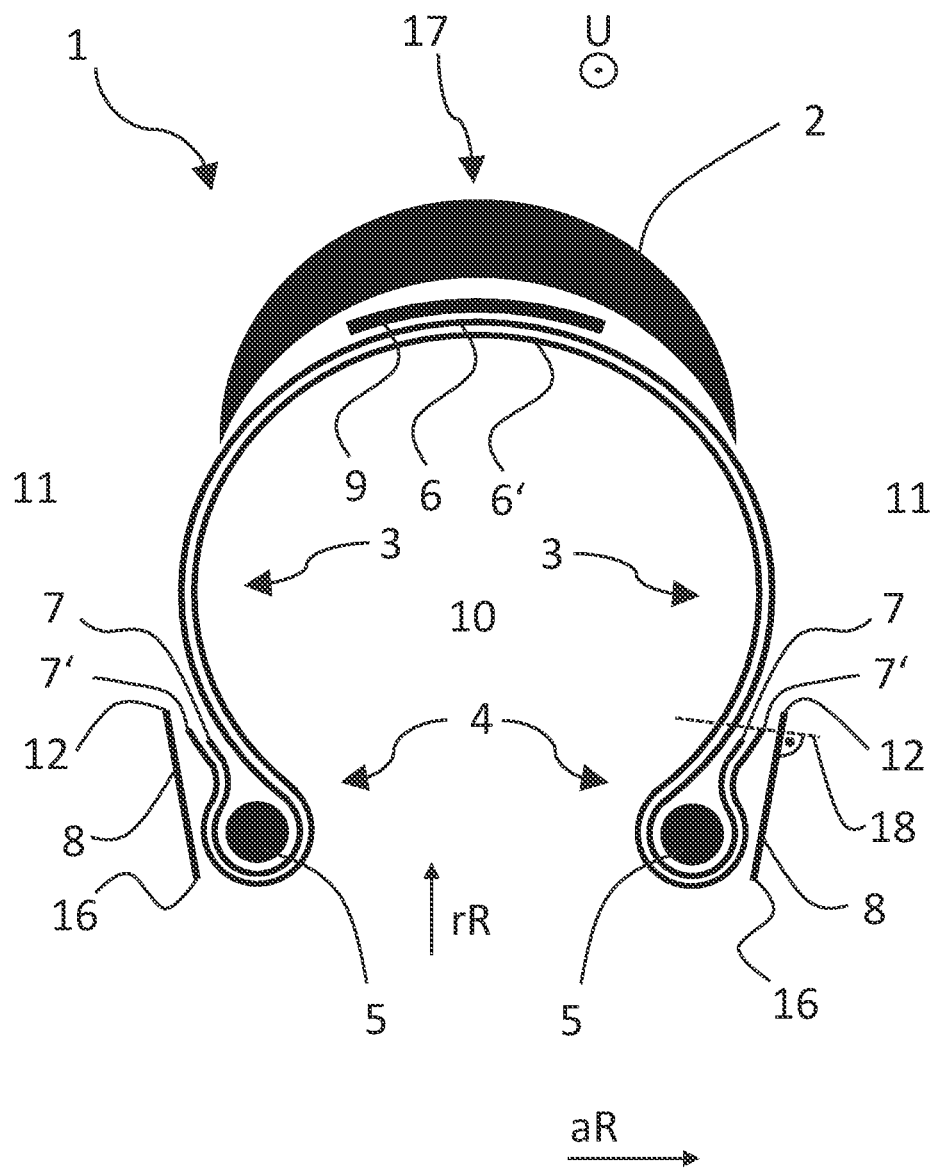

carcass inlay (6') is formed by that carcass inlay of the two carcass inlays (6, 6') which is the radially inner carcass inlay in the zenith region (17). The invention furthermore relates to a two-wheeled vehicle having a tire of said type.

5 Claims, 2 Drawing Sheets

(58) Field of Classification Search
 CPC ............. B60C 2015/065; B60C 9/18; B60C 2009/1842; B60C 2009/1857
 See application file for complete search history.

(56) References Cited

U.S. PATENT DOCUMENTS

| | | |
|---|---|---|
| 2009/0159164 A1 | 6/2009 | Ishiyama et al. |
| 2017/0136819 A1 | 5/2017 | Wurmback |
| 2020/0207151 A1 | 7/2020 | Erbizzoni et al. |

FOREIGN PATENT DOCUMENTS

| | | | |
|---|---|---|---|
| DE | 202012007834 U1 | 11/2013 | |
| DE | 102014214892 A1 | 2/2016 | |
| DE | 202015000366 U1 | 4/2016 | |
| EP | 0901915 A2 | 3/1999 | |
| EP | 928704 A1 * | 7/1999 | ............. B60C 9/06 |
| EP | 1384601 A1 | 1/2004 | |
| EP | 1632364 A1 | 3/2006 | |
| EP | 1918128 A1 | 5/2008 | |
| EP | 3174738 A1 | 6/2017 | |
| EP | 3174738 B1 | 8/2019 | |
| JP | 3231002 A * | 10/2000 | |
| WO | 2019025953 A1 | 2/2019 | |

OTHER PUBLICATIONS

CN office action dated Mar. 19, 2025 of counterpart Chinese Application No. 202180060586.9.

* cited by examiner

PNEUMATIC TIRE FOR BICYCLE

The invention relates to a two-wheeled vehicle pneumatic tire, preferably bicycle tire, particularly preferably racing bike tire, having a tread, a tire carcass, tire side walls and two bead regions, each with a tire bead with a core, wherein the tire carcass comprises two carcass inlays, wherein the two carcass inlays each have individual reinforcement members running parallel to one another, the reinforcement members being arranged at an angle of 40 degrees to 60 degrees with respect to the direction of rotation U and the reinforcement members of the two carcass inlays having an opposite pitch angle, wherein the two carcass inlays extend from a zenith region of the two-wheeled vehicle pneumatic tire over the tire side walls as far as the two bead regions and are looped there around the respective core from axially on the inside axially outward and end with carcass inlay ends having reinforcement member ends of the carcass inlay, and wherein the two bead regions each have a bead protective strip arranged on the carcass from the outside as protection against chafing. The invention furthermore relates to a two-wheeled vehicle having a tire of said type.

Conventional two-wheeled vehicle pneumatic tires, preferably bicycle tires, particularly preferably racing bike tires, are designed and optimized in terms of rolling resistance, puncture protection, and mileage. Racing bike tires are frequently distinguished in that the carcass turn-up of the two tire halves below the tread is arranged in an overlapping manner. As a result, in the case of a single-ply carcass, three plies of the carcass inlay lie one on top of another at the zenith of the tire radially inside the tread. When the tire is in operation, this leads to strong frictional forces between the three carcass plies arranged one on top of another, which has a negative effect on the rolling resistance.

In addition, there is a fabric connection between the tire interior and the tire exterior that is disadvantageous for the airtightness of the tire.

An advantageous reduction in the ply thickness in the zenith region to two plies is disclosed in EP3174738 A1. This discloses a racing bike tire having a carcass formed from two carcass inlays arranged one on top of the other, the two carcass inlays being looped around the core, the turned-up carcass inlays partially covering the sidewall, and the carcass inlay ends ending radially between the lateral edge regions of the tread and a rim strip. However, such a tire is reinforced in at least part of the sidewall by four ply thicknesses of the carcass, which increases the friction between the carcass plies and the use of carcass material in the sidewall region, which has a negative effect on the weight and the rolling resistance. As with the single-ply construction mentioned, in this tire construction there is also a fabric connection between the tire interior and the tire exterior that is disadvantageous for the airtightness of the tire.

The trend is towards improving the rolling resistance in two-wheeled vehicle pneumatic tires, preferably in bicycle tires, particularly preferably in racing bike tires. A low rolling resistance is of fundamental importance for racing bike tires.

The invention is based on the object of creating a two-wheeled vehicle pneumatic tire, preferably a bicycle tire, particularly preferably a racing bike tire, in which the rolling resistance is improved.

The problem is solved with regard to the two-wheeled vehicle tire in that the carcass inlay ends of the inner carcass inlay are covered from the outside by the respective bead protective strip, wherein the inner carcass inlay is formed by that carcass inlay of the two carcass inlays which is the radially inner carcass inlay in the zenith region.

One advantage of the two-wheeled vehicle pneumatic tire according to the invention, preferably the bicycle tire, particularly preferably the racing bike tire, can be considered in particular that of substantially improving the rolling resistance by the novel tire construction.

It is essential to the invention that the carcass inlay ends are arranged in such a way that they are covered from the outside by the respective bead protective strip. The carcass inlay ends and thus the reinforcement member ends of the inner carcass inlay are thus arranged between the bead protective strip and the outer carcass inlay, wherein a rubber coating of the inner carcass inlay can be arranged between the reinforcement member ends of the carcass inlay end and the bead protective strip. A straight line oriented perpendicular to the bead protective strip can connect the bead protective strip and the carcass inlay end.

The inner carcass inlay is formed here by that carcass inlay of the two carcass inlays which is the radially inner carcass inlay in the zenith region. The outer carcass inlay is formed here by that carcass inlay of the two carcass inlays which is the radially outer carcass inlay in the zenith region.

The two-wheeled vehicle pneumatic tire thus permits the advantages of a carcass with at least two full carcass inlays with a simultaneously reduced ply thickness because of the carcass turn-ups of the two carcass inlays in the region of the sidewall adjoining the bead strip radially from the outside. The ply thickness of the carcass is thus reduced in the sidewall, particularly in a region that is particularly stressed by cyclic deformations during operation of the tire. Thus, the number of plies of the two carcass inlays lying one on top of the other in this region, between which friction losses reduce the rolling resistance, is reduced. Furthermore, the use of material for the inner carcass inlay and thus the weight of the carcass is advantageously reduced.

It has been found that a two-wheeled vehicle tire, preferably a bicycle tire, particularly preferably a racing bike tire, having the novel construction has a particularly low rolling resistance.

As usual, the bead protective strip serves as protection against chafing in relation to a rim flange when the tire is in operation and thus prevents the carcass threads from being exposed. The bead protective strip may be involved in forming or may form an outer surface of the bead region designed as a contact surface to the rim.

The novel construction continues to protect the core particularly well from damage because of the two carcass inlays looped around it.

Advantageous developments of the invention will be explained below. Corresponding advantages also arise for a two-wheeled vehicle having such a tire.

In an advantageous development of the invention, it is provided that the bead protective strip ends at a radially outer end at a first height of at most 15 mm, preferably of 10 mm to 12 mm, as measured relative to an outermost turning point of the reinforcement members of the inner carcass inlay that are looped around the core.

Owing to this low arrangement of both the bead protective strip and the carcass inlay ends of the inner carcass inlay, the carcass turn-ups of the inner carcass inlay are thus primarily arranged in a region which experiences little or no cyclic deformation during operation of the tire. Thus, the energy loss due to friction of the carcass turn-up of the inner carcass inlay can be further reduced. Similarly, the use of material for the bead protective strip and for the inner carcass inlay, and thus the weight of the tire, is advantageously reduced.

To determine the first height, the two-wheeled vehicle pneumatic tire can be bent up in its cross section in such a way that the two carcass inlays coming from the zenith are arranged substantially rectilinearly in the region of the sidewall and merge into a looping around the core that is substantially symmetrical with respect to the core. In this arrangement, the first height of the radially outer end of the bead protective strip is measured relative to the outermost turning point of an outer edge of the reinforcement members of the inner carcass inlay that are looped around the core, as measured parallel to the substantially rectilinearly arranged carcass inlays.

If the bead protective strip comprises fibers, in particular a fabric, the fibers, in particular the fabric edge of the fabric, predetermine the radially outer end of the bead protective strip.

In a further advantageous development of the invention, it is provided that the carcass inlay ends of the inner carcass inlay are arranged at a second height of at most 13 mm, preferably of 8 mm to 10 mm, as measured relative to an outermost turning point of the reinforcement members of the inner carcass inlay that are looped around the core.

The carcass inlay ends of the inner carcass inlay are thus primarily arranged in a region which undergoes little or no cyclic deformation during operation of the tire. Thus, the energy loss due to friction of the carcass turn-up of the inner carcass inlay is further reduced. Furthermore, the use of material for the inner carcass inlay and thus the weight of the carcass is advantageously reduced.

To determine the second height, the two-wheeled vehicle pneumatic tire can be bent up in its cross section in such a way that the two carcass inlays coming from the zenith are arranged substantially rectilinearly in the region of the sidewall and merge into a looping around the core that is substantially symmetrical with respect to the core. In this arrangement, the second height of the carcass inlay ends, as measured relative to the outermost turning point of an outer edge of the reinforcement members of the inner carcass inlay that are looped around the core, is parallel to the substantially rectilinearly arranged carcass inlays.

Corresponding advantages arise if the carcass inlay ends of the inner carcass inlay end in the bead region, in particular coming from the core in front of the sidewall.

In a further advantageous development of the invention, it is provided that the bead protective strip is designed as a rubberized band having fibers, in particular as a rubberized fabric band.

A further advantage of the novel construction is that, because the carcass inlay ends of the inner carcass inlay are covered by the bead protective strip, there is no direct connection between the interior of the tire and the exterior of the tire by means of a carcass inlay. Likewise, with the carcass inlay ends, the carcass inlay reinforcement members ending there are covered from the outside with the bead protective strip. This avoids or greatly reduces air being blown out of the interior of the tire through the two carcass inlays, in particular in tubeless operation, as a result of which the airtightness of the tire in tubeless operation is greatly improved in a simple manner.

The fibers of the rubberized band can be knitted into a fabric. This may be a nettle fabric or a nylon fabric.

In a further advantageous development of the invention, it is provided that the bead protective strip is free of threads which have intertwined fibers and connect a radially outer end of the bead protective strip and an inner end of the bead protective strip.

In the case of threads which have intertwined fibers, the threads connecting the radially outer end of the bead protective strip and the inner end of the bead protective strip to one another, air can be blown out of a tire interior through microchannels. This has a negative effect on the airtightness in tubeless operation of the tire. A lack of threads arranged and formed in this way thus advantageously contributes to the airtightness between tire and rim when the tire is mounted in tubeless operation.

Corresponding advantages arise in particular for a two-wheeled vehicle having such a tire in tubeless operation.

It is provided in a further advantageous development of the invention that the bead protective strip is designed as a rubberized monofilament fabric.

The rubberized monofilament fabric is particularly effective in reducing air leakage at the tire/rim contact region, in particular more effectively than a conventional bead protective strip having a fabric comprising threads consisting of a plurality of intertwined fibers. The reason for this is that the monofilaments are substantially embedded individually in the rubber coating and thus the air is substantially prevented from being blown out of the tire interior to the tire exterior by means of microchannels between the fibers of the threads of the bead protective strip.

This enables the tire mounted on the rim to be particularly airtight. Corresponding advantages arise in particular for a two-wheeled vehicle having such a tire in tubeless operation.

Operation of the tire without a tube can therefore be made possible without further complex measures that often worsen the rolling resistance, such as an inner liner.

It is provided in a further advantageous development of the invention that the carcass is in direct contact with the tire interior.

The two-wheeled vehicle tire, preferably the bicycle tire, particularly preferably the racing bike tire, is in particular free from an inner liner that is designed to be substantially airtight and is arranged between the carcass and the tire interior. This enables a particularly lightweight tire and thus an advantageous rolling resistance. For tubeless operation, in particular as a "tubeless ready" bicycle tire, sufficient airtightness can be ensured by the measures described, in particular the design of a bead protective strip designed as a rubberized monofilament fabric.

Corresponding advantages arise in particular for a two-wheeled vehicle having such a tire in tubeless operation.

In a further advantageous development of the invention, it is provided that the tire is in particular a "tubeless" tire or a "tubeless ready" tire.

Tubeless tires for tubeless operation of the two-wheeled vehicle pneumatic tire, preferably the bicycle tire, preferably the racing bike tire, place increased demands on the airtightness of both the tire itself and the seal at the contact surface between tire and rim. In tubeless operation of the tire, there are no friction losses between the tube and the tire, and therefore the tire permits an advantageous rolling resistance. Tube-based reasons for punctures are also eliminated.

When operating a tire for tubeless operation, the use of a sealing liquid, in particular a milk sealant, which is filled into the tire interior between the tire and the rim, can improve the tightness.

A two-wheeled vehicle pneumatic tire, in particular a racing bike tire, for tubeless operation can be a so-called "tubeless" tire, which is primarily or exclusively suitable for operation without a tube. A tubeless tire can often be used without milk sealant.

It can also be a so-called "tubeless ready" tire, which is suitable for operation both with and without a tube. As a rule, a tubeless ready tire is used with a sealing liquid, in particular a milk sealant, in tubeless operation. The tire and rim can be designed here in such a way that they seal directly against each other.

In a further advantageous development of the invention, it is provided that the tire is a bicycle tire for operation with a tube, in particular a clincher tire.

When a tire is operated with a tube, the air pressure is maintained via a substantially airtight tube arranged in the interior of the tire between the tire and the rim. Here, too, the novel tire construction permits an advantageously reduced rolling resistance.

A so-called clincher tire is usually a wired tire or a folding tire. The tire then has a wire core or a folding core and is hung with the bead on the rim flange of the rim. A clincher tire can be mounted and dismounted using simple means. In the event of a puncture, the damage can be easily repaired.

In a further advantageous development of the invention, it is provided that at least in one region of the side wall, the two carcass inlays are the only inlays having reinforcement members.

By dispensing with an inlay which has additional reinforcement members, a particularly thin and therefore lightweight sidewall with optimized rolling resistance is made possible. The carcass, which has at least two plies in the region of the side wall, already enables sufficient strength and, owing to the two-ply construction, provides a cutting resistance which is sufficient in particular for bicycle tires.

In a further advantageous development of the invention, it is provided that the carcass inlay ends of the outer carcass inlay of the two carcass inlays can be covered from the outside by the inner carcass inlay or by the bead protective strip.

The outer carcass inlay here is the outer of the two carcass inlays in the zenith region.

This allows a further reduction in the ply thickness of the carcass radially outside the bead protective strip to just two plies. The rolling resistance can be further reduced because of the lower friction loss and the reduction in material. In addition, in the zenith region of the tire, a carcass inlay thickness of only two plies is made possible, in which the tire carcass has a high degree of elasticity below the tread and the friction losses between the carcass inlays are low.

In a further advantageous development of the invention, it is provided that a damping rubber inlay made from a highly elastic rubber is arranged between the tread and the tire carcass, wherein the damping rubber inlay in particular has a material thickness between 0.2 and 1 mm.

Greater ride comfort and a better rolling resistance are thereby made possible by decoupling the fabric plies. The ride comfort of the bicycle tire is substantially improved owing to the special material thickness of the damping rubber inlay, since the bicycle tire overall is better able to adapt to the road surface.

The damping rubber inlay can preferably be composed of a highly elastic rubber having a material rebound value between 70 and 80. Optimum ride comfort is achieved at this material rebound value, with the rolling resistance of the bicycle tire not being simultaneously increased.

In a further advantageous development of the invention, it is provided that a protective ply comprising a particularly tear-resistant fabric, preferably a fabric comprising fibers made from polyethylene terephthalate-polyacrylate, is arranged between the tread and the tire carcass.

The protective ply ensures optimal puncture protection for the two-wheeled vehicle pneumatic tire, preferably the bicycle tire, particularly preferably the racing bike tire. The fabric having fibers made of polyethylene terephthalate-polyacrylate can be a fabric that has or consists of Vectran fibers.

In a further advantageous development of the invention, it is provided that the reinforcement members are arranged at an angle to the direction of rotation U of 42 degrees to 48 degrees, preferably 43 degrees to 48 degrees. This results in a particularly advantageous diagonal carcass.

In a further advantageous development of the invention, it is provided that the two carcass inlays are the only carcass inlays of the carcass. This permits a precisely two-ply carcass inlay with little use of material.

In a particularly advantageous development of the invention, it is provided that the tire is a bicycle tire, in particular a racing bike tire, a mountain bike tire or a tire for a bicycle having an electric motor for driving the bicycle.

The novel tire construction is particularly advantageous in the case of bicycle tires.

The novel tire construction can be particularly advantageously used in racing bike tires, since the rolling resistance is substantially reduced. A racing bike tire usually has a maximum tire width of 35 mm and exhibits a racing bike-specific low profiling of the tread.

The novel tire construction, especially for tubeless tires, is also ideal for mountain bike tires. Mountain bike tires usually have a minimum tire width of 35 mm, in particular 40 mm, and often have a pronounced profiling of the tread. Aspects such as rolling resistance are also becoming increasingly important for mountain bike tires. In particular, tubeless operation of the tire may be advantageous since the susceptibility to punctures is then reduced and such a tire can be used at a comparatively lower air pressure.

The novel tire construction is also ideally suited for use on bicycles having an electric motor for driving the bicycle. When used in this way, a low rolling resistance is advantageous because it increases the range of the bicycle.

The tire can be a tire for an electric bicycle. A tire for an electric bicycle can satisfy the test standard "ECE R75". The suitability for an electric bike is often indicated by the designation "E-bike ready 50".

The tire can also be a tire for a pedelec, in which the drive is at least partially assisted by the electric motor. The suitability for a pedelec is often indicated by the designation "E-bike ready 25".

The novel tire construction is suitable for use in all bicycle segments.

It is provided in a further advantageous development of the invention that the tire is a motorcycle tire, in particular an electric scooter tire.

A motorcycle tire or an electric scooter tire having the novel construction can also contribute via the advantageous rolling resistance to an improved range of the vehicle.

With regard to the two-wheeled vehicle, the problem is solved in that the two-wheeled vehicle has a tire according to the invention.

In an advantageous development of the invention, it is provided that the two-wheeled vehicle is a bicycle, in particular a racing bike or a mountain bike, or a bicycle having an electric motor for driving the bicycle, in particular a racing bike or a mountain bike.

Such a two-wheeled vehicle can be operated with a particularly advantageous rolling resistance.

In an advantageous development of the invention, it is provided that a tire interior enclosed by a rim and the tire does not have a tube.

The two-wheeled vehicle thus has a tubeless tire and is operated in tubeless operation. In tubeless operation of the tire, there are no friction losses between the tube and the tire, and therefore the tire permits an advantageous rolling resistance. Tube-based reasons for punctures are also eliminated. For tubeless operation, both the tire itself and the contact region between tire and rim must be sufficiently airtight. This is made possible by the tire according to the invention.

When operating a tire for tubeless operation, the use of a sealing liquid, in particular a milk sealant, which is filled into the tire interior between the tire and the rim, can improve the tightness.

Figure 2:
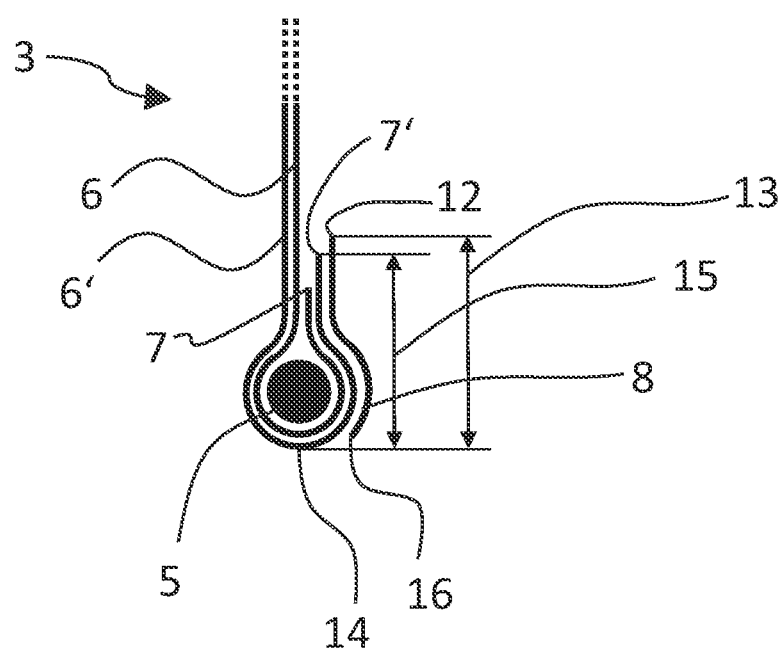

Further features, advantages and details of the invention will now be explained in more detail with reference to the schematic drawings, which represent exemplary embodiments. In the drawings:

FIG. 1: shows a two-wheeled vehicle tire in cross section;

FIG. 2: shows a detail of a two-wheeled vehicle tire in cross section.

FIG. 1 shows the essential tire components of the two-wheeled vehicle tire 1 in a cross-sectional view. The tire is a two-wheeled vehicle pneumatic tire 1, preferably a bicycle tire, particularly preferably a racing bike tire 1, with a tread 2, a tire carcass, tire sidewalls 3 and two bead regions 4, each with a tire bead with a core 5.

The tire carcass comprises two carcass inlays 6,6', wherein the two carcass inlays 6, 6' each have individual reinforcement members running parallel to one another, the reinforcement members being arranged at an angle of 40 degrees to 60 degrees with respect to the direction of rotation U and the reinforcement members of the two carcass inlays 6 having an opposite pitch angle, and wherein the two carcass inlays 6, 6' extend from a zenith region 17 of the two-wheeled vehicle pneumatic tire 1 over the tire sidewalls 3 as far as the two bead regions 4 and are looped there around the respective core 5 from axially on the inside axially outward and end with carcass inlay ends 7,7' having reinforcement member ends of the carcass inlay 6,6'.

Furthermore, the two bead regions 4 each have a bead protective strip 8 arranged on the carcass from the outside as protection against chafing.

The two-wheeled vehicle tire is distinguished in that at least the carcass inlay ends 7' of the inner carcass inlay 6' are covered from the outside by the respective bead protective strip 8, wherein the inner carcass inlay 6' is formed by that carcass inlay of the two carcass inlays 6, 6' which is the radially inner carcass inlay in the zenith region 17. The outer carcass inlay 6 is formed here by that carcass inlay of the two carcass inlays 6, 6' which is the radially outer carcass inlay in the zenith region.

The carcass inlay ends 7' and thus the reinforcement member ends of the inner carcass inlay 6' are thus arranged between the bead protective strip 8 and the outer carcass inlay 6, wherein a rubber coating of the inner carcass inlay 6' can be arranged between the reinforcement member ends of the carcass inlay end 7'' and the bead protective strip 8. A straight line 18 oriented perpendicular to the bead protective strip 8 can connect the bead protective strip 8 and the carcass inlay end 7'.

In the case of rubberized plies having reinforcement members, in particular the carcass inlays 6, 6' and/or the bead protective strip 8, the lines shown schematically represent the extent of the reinforcement members.

The bead protective strip 8 can end at a radially outer end 12 at a first height 13 of at most 15 mm, preferably of 10 mm to 12 mm, as measured relative to an outermost turning point 14 of an outer edge of the reinforcement members of the inner carcass inlay 6' that are looped around the core 5. Alternatively or additionally, the carcass inlay ends 7' of the inner carcass inlay 6' can be arranged at a second height 15 of at most 13 mm, preferably of 8 mm to 10 mm, as measured relative to an outermost turning point 14 of the reinforcement members of the inner carcass inlay 6' that are looped around the core 5.

A dimensioning of the first height 13 and the second height 15 is illustrated in FIG. 2.

The bead protective strip 8 is designed as a rubberized band having fibers, in particular as a rubberized fabric band. The fibers, in particular the fabric edge of the fabric, predetermine the radially outer end 12 of the bead protective strip 8.

The carcass inlay ends 7' of the inner carcass inlay 6' can end in the bead region 4, in particular coming from the core 5 in front of the sidewall 3.

In particular for tubeless operation, the bead protective strip 8 is free of threads which have intertwined fibers and connect a radially outer end 12 of the bead protective strip 8 and an inner end 16 of the bead protective strip 8. For this purpose, the bead protective strip 8 can be designed as a rubberized monofilament fabric.

The carcass can be in direct contact with the tire interior 10.

At least in one region of the sidewall 3, in particular adjoining the bead strip 8 radially from the outside, the two carcass inlays 6, 6' can be the only inlays having reinforcement members.

The carcass inlay ends 7 of the outer carcass inlay 6 of the two carcass inlays 6,6' can be covered from the outside by the inner carcass inlay 6' or by the bead protective strip 8. The outer carcass inlay 6 here is the radially outer of the two carcass inlays 6, 6' in the zenith region.

A damping rubber inlay (9) composed of a highly elastic rubber can be arranged between the tread (2) and the tire carcass, the damping rubber inlay 9 having in particular a material thickness between 0.2 mm and 1 mm. The damping rubber inlay can preferably be composed of a highly elastic rubber having a material rebound value between 70 and 80.

A protective ply (not shown) comprising a particularly tear-resistant fabric, preferably a fabric comprising fibers made of polyethylene terephthalate-polyacrylate, can be arranged between the tread 2 and the tire carcass.

The reinforcement members of the carcass inlays are preferably arranged at an angle to the direction of rotation U of 42 degrees to 48 degrees, particularly preferably 43 degrees to 48 degrees.

The tire can in particular be a "tubeless" tire or a "tubeless ready" tire. The tire can be suitable, intended and used for tubeless operation. The tire for tubeless operation or the tubeless tire can in particular be part of a bicycle, with the tire interior 10 enclosed by a rim and the tire 1 being without a tube.

The tire can be a bicycle tire 1, in particular a racing bike tire 1, a mountain bike tire or a tire for a bicycle having an electric motor for driving the bicycle. The tire can be suitable, intended and used for a corresponding bicycle. In particular, a bicycle, in particular a racing bike, a mountain bike or a bicycle having an electric motor for driving the bicycle, can have such a tire 1.

The tire 1 shown is preferably a racing bike tire.

A tire for operation with a tube, in particular a clincher tire, can also have a corresponding advantageous construction. Motorcycle tires, in particular electric scooter tires, can also have the advantageous construction shown.

FIG. 2 illustrates the dimensioning of the first height 13 and the second height 15.

To determine the first height 13 and the second height 15, the two-wheeled vehicle pneumatic tire 1 can be bent up in its cross section in such a way that the two carcass inlays 6, 6' coming from the zenith region 17 are arranged substantially rectilinearly in the region of the sidewall 3 and merge into a looping around the core 5 that is substantially symmetrical with respect to the core 5. This can be a detail of the tire of FIG. 1, with the two-wheeled vehicle pneumatic tire 1 being correspondingly bent up in its cross section.

In this arrangement, the first height 13 of the radially outer end 12 of the bead protective strip 8 is measured relative to the outermost turning point 14 of an outer edge of the reinforcement members of the inner carcass inlay 6' that are looped around the core 5 and measured parallel to the carcass inlays 6, 6' that are arranged substantially rectilinearly.

In this arrangement, the second height 15 of the carcass inlay ends 7' is measured relative to the outermost turning point 14 of an outer edge of the reinforcement members of the inner carcass inlay 6' that are looped around the core and measured parallel to the carcass inlays 6, 6' arranged substantially rectilinearly.

LIST OF REFERENCE DESIGNATIONS

Part of the Description

1 Two-wheeled vehicle pneumatic tire
2 Tread
3 Sidewall
4 Bead region
5 Core
6 Outer carcass inlay
6' Inner carcass inlay
7 Carcass inlay end of the outer carcass inlay
7' Carcass inlay end of the inner carcass inlay
8 Bead protective strip
9 Rubber inlay
10 Tire interior
11 Tire exterior
12 Radially outer end of the bead protective strip
13 First height
14 Outermost turning point
15 Second height
16 Inner end
17 Zenith region
18 Straight line
rR Radial direction
aR Axial direction
U Direction of rotation

The invention claimed is:

1. A tubeless or tubeless-ready pneumatic bicycle tire comprising:
   a tread positioned proximate a top portion of the tire;
   a tire carcass comprising an outer carcass inlay and an inner carcass inlay, the tire carcass positioned below the tread with the outer carcass inlay being outward of the inner carcass inlay in a zenith region under the tread, and the inner carcass inlay being in direct contact with an interior space of the tubeless or tubeless-ready tire;
   tire side wall regions on sides of the tire constructed with side portions of the tire carcass;
   two bead regions positioned below respective bases of the tire side wall regions, each of the bead regions with a tire bead and a core;
   the inner and outer carcass inlays each have individual reinforcement members running parallel to one another, the reinforcement members of each carcass inlay being arranged to enclose an angle of 40 degrees to 60 degrees with respect to the direction of rotation, and the reinforcement members of the inner and outer carcass inlays having an opposite pitch angle;
   the inner and outer carcass inlays each extend from the zenith region through the tire side wall regions to the two bead regions, are looped outwardly around the respective cores, and terminate at respective carcass inlay ends of the inner and outer carcass inlays;
   the carcass inlay ends of both the inner and outer carcass inlays terminate in the bead region, with the respective carcass inlay ends of the inner carcass inlay terminating at a height of at most 13 mm as measured relative to an outermost turning point of the reinforcement members of the inner carcass inlay that are looped around the respective cores;
   bead protective strips arranged on the carcass to cover the carcass inlay ends of both the inner and outer carcass inlays on both sides of the tire, each of the bead protective strips extending to cover a portion of the respective bead region, with each bead protective strip terminating at its radially outer end at a height of at most 15 mm as measured relative to the outermost turning point of the reinforcement members of the inner carcass inlay that are looped around the respective cores;
   the bead protective strips each being formed from a rubberized monofilament fabric that is free of intertwined fibers and microchannels;
   wherein the arrangement and structure of the bead protective strips promotes airtightness along with the inner and outer carcass inlays for tubeless or tubeless-ready operation; and
   wherein the carcass, in the respective tire sidewall regions between (i) the respective radially outer ends of the bead protective strips and (ii) the tread, has only two carcass inlay plies with reinforcement members, with one of the two carcass inlay plies being only one ply of the inner carcass inlay and the other of the two carcass inlay plies being only one ply of the outer carcass inlay.

2. The tire of claim 1, wherein the outer carcass inlay end terminates prior to the inner carcass inlay end, such that the outer carcass inlay end is covered by the inner carcass inlay.

3. The tire of claim 1,
   further comprising a damping rubber inlay positioned between the tread and the tire carcass proximate the top portion of the tire;
   wherein the damping rubber inlay comprises a highly elastic rubber having a rebound value of between 70 and 80, and
   wherein the damping rubber inlay (9) has a material thickness between 0.2 and 1 mm.

4. The tire of claim 1, wherein the radially outer end of each bead protective strip terminates the height of 10 mm to 12 mm, as measured relative to the outermost turning point of the reinforcement members of the inner carcass inlay that are looped around the respective cores.

5. The tire of claim 4, wherein the respective inner carcass inlay ends of the inner carcass inlay terminate at the height of 8 mm to 10 mm, as measured relative to the outermost turning point of the reinforcement members of the inner carcass inlay that are looped around the respective cores.

\* \* \* \* \*